(12) United States Patent
Goldberg et al.

(10) Patent No.: US 7,930,754 B2
(45) Date of Patent: Apr. 19, 2011

(54) METHOD FOR CONCEALING USER IDENTITIES ON COMPUTER SYSTEMS THROUGH THE USE OF TEMPORARY ALIASES

(75) Inventors: Itzhack Goldberg, Hadera (IL); Julianne Frances Haugh, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1460 days.

(21) Appl. No.: 11/334,663

(22) Filed: Jan. 18, 2006

(65) Prior Publication Data

US 2007/0169202 A1  Jul. 19, 2007

(51) Int. Cl.
  *G06F 7/04* (2006.01)
  *G06Q 40/00* (2006.01)

(52) U.S. Cl. ............................. 726/26; 705/39

(58) Field of Classification Search ............... 726/26–30; 713/163, 184, 187; 705/39; 709/206, 229
See application file for complete search history.

(56) References Cited

U.S. PATENT DOCUMENTS

| | | | | |
|---|---|---|---|---|
| 5,479,494 A * | 12/1995 | Clitherow | ............... | 379/114.15 |
| 6,055,635 A * | 4/2000 | Karlsson | ..................... | 713/184 |
| 6,314,439 B1 | 11/2001 | Bates et al. | | |
| 6,453,294 B1 | 9/2002 | Dutta et al. | | |
| 6,463,533 B1 * | 10/2002 | Calamera et al. | ............. | 713/163 |
| 6,496,931 B1 | 12/2002 | Rajchel et al. | | |
| 6,643,685 B1 | 11/2003 | Millard | | |
| 6,802,007 B1 | 10/2004 | Canelones et al. | | |
| 2002/0099832 A1 | 7/2002 | Yaegerman et al. | | |
| 2003/0132285 A1 * | 7/2003 | Blancas et al. | ................ | 235/380 |
| 2003/0233409 A1 * | 12/2003 | Awada et al. | ................ | 709/206 |
| 2005/0086160 A1 * | 4/2005 | Wong et al. | ..................... | 705/39 |
| 2006/0026438 A1 * | 2/2006 | Stern et al. | ..................... | 713/184 |

OTHER PUBLICATIONS

Dorenbosch, "Alias for SIP user", ip.com PF2217NA ip.doc, Motorola Inc., Feb. 2001, pp. 1-3.
Lazarony, "Perishable credit card numbers take the fear out of Web shopping", posted Mar. 23, 2004, http://www.Bankrate.com/brm/news/cc/20021011a.asp, retrieved Sep. 20, 2005, pp. 1-3.
"Security Guide Login control", http://publib.boulder.ibm.com/infocenter/pseries/topic/com.ibm.aix.doc/aixbman/security/login control.htm retrieved Sep. 20, 2005, pp. 1-5.
"Files Reference login.cfg File", http://publib.boulder.ibmn.com/infocenter/pseries/topic/com.ibm.aix.doc/files/aiuxfiles/login.cfg.htm, retrieved Sep. 20, 2005, pp. 1-4.
Depwe et al., "Alias Naming for Remote Profiles", IBM Technical Disclosure Bulletin, Mar. 1988, p. 181.

* cited by examiner

*Primary Examiner* — K. Vu
*Assistant Examiner* — S. Debnath
(74) *Attorney, Agent, or Firm* — Matthew W. Baca; Amy J. Pattillo

(57) ABSTRACT

A user alias for concealing a user's user identification is provided. When signing-on, the user inputs a user alias to a log-in shell. The log-in shell verifies the validity of the user alias. The log-in shell then obtains a user identification associated with the valid user alias.

17 Claims, 3 Drawing Sheets

METHOD FOR CONCEALING USER IDENTITIES ON COMPUTER SYSTEMS THROUGH THE USE OF TEMPORARY ALIASES

BACKGROUND OF THE INVENTION

1. Field of the Invention

The present invention relates generally to data processing systems. More specifically the present invention provides a method, computer program product and data processing system for concealing user identities through the use of aliases.

2. Description of the Related Art

Computers are now prevalent in almost every aspect of daily life, from sending e-mails to making on-line purchases. As the use of computers and data processing systems has grown, so has the need to provide security for these data processing systems.

Looking back on the early days of Unix system security, the "encrypted" password used to ensure secure sign-ons was viewable to anyone because the password appeared on the screen in a field called password. Eventually this mistake was corrected and the "encrypted" password was moved to a file that was only accessible to the super-user called root in Unix or administrator in Windows. This change made the system more secure and less vulnerable to attacks.

Another security technique that has been employed is the lack of information or misinformation that is given to a denied user. It quickly became apparent that telling a user attempting to sign-on that he/she had provided an invalid user identification or that he/she had failed to provide a correct password gave potential attackers clues in cracking the security system. Therefore, currently, most security systems go through the motions of verifying sign-on information by accepting incorrect passwords and non-existent users and provide a message only to the extent that the attempted sign-on has failed, rather then denying the existence of the user immediately. Thus, the attacker is not provided any additional information as to the identity of users on the system.

However, this method still has flaws. When a user attempts to sign-on, the user types his/her user identification in the clear, on the screen, in full view of potential hackers or thieves. This defeats the very purpose of going through the motions of the security measure, as the hacker or thief can readily obtain a valid user name and simply concentrate on cracking the password.

SUMMARY OF THE INVENTION

The present invention provides a method, system, and computer program product for concealing a user identification. User input, comprising a user alias is received. The received user alias is verified as a valid user alias. A user identification associated with the valid user alias is obtained.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
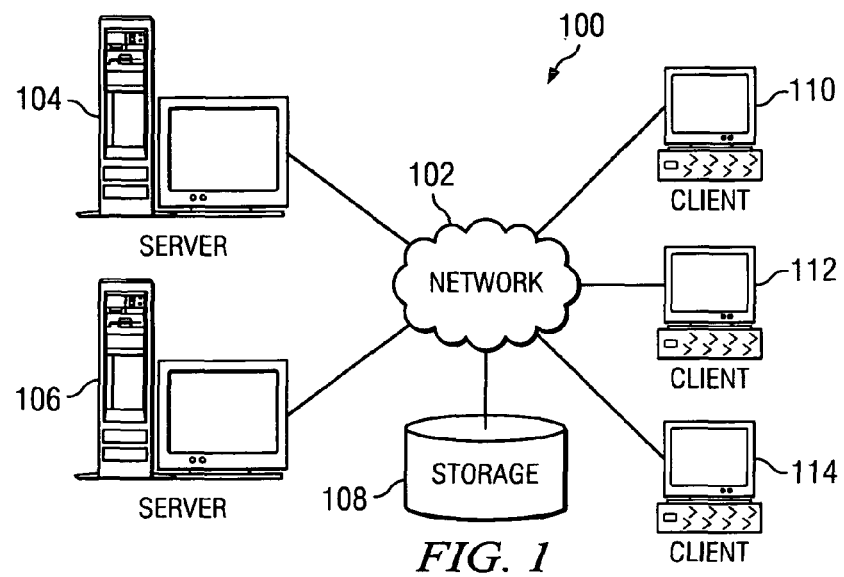
FIG. 1 is a pictorial representation of a network of data processing systems in which exemplary aspects of the present invention may be implemented.
Figure 2:
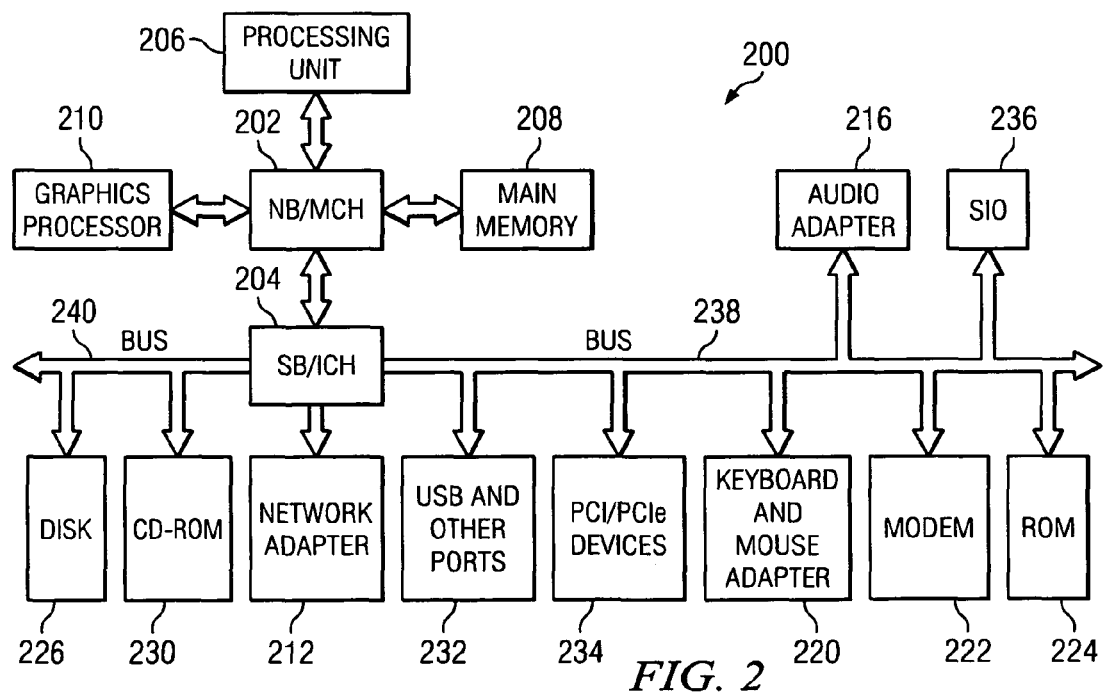
FIG. 2 is a block diagram of a data processing system in which exemplary aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, LAN adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java programs or applications executing on data processing system 200 (Java is a trademark of Sun Microsystems, Inc. in the United States, other countries, or both).

As a server, data processing system 200 may be, for example, an IBM eServer™ pSeries® computer system, running the Advanced Interactive Executive (AIX®) operating system or LINUX operating system (eServer, pSeries and AIX are trademarks of International Business Machines Corporation in the United States, other countries, or both while Linux is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
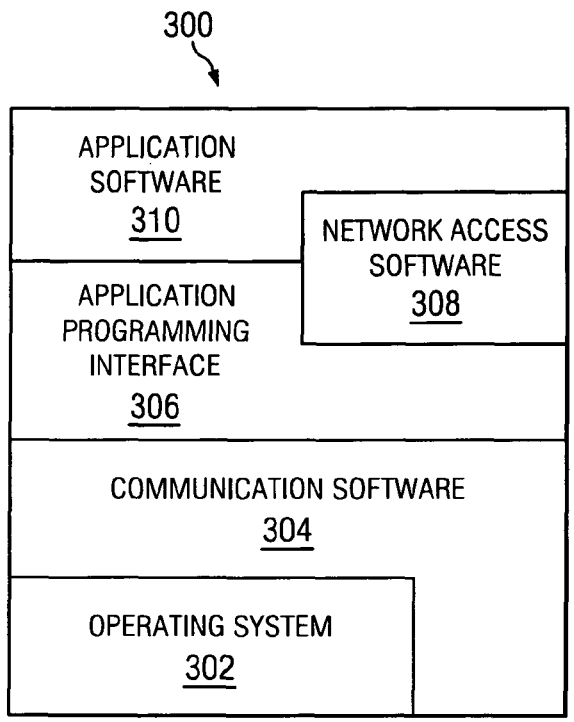
FIG. 3 is a block diagram depicting typical software architecture for a server-client system in which exemplary aspects of the present invention may be implemented.

Turning to FIG. 3, typical software architecture for a server-client system is depicted in which exemplary aspects of the present invention may be implemented. At the lowest level, operating system 302 is utilized to provide high-level functionality to the user and to other software. Such an operating system typically includes a basic input/output system (BIOS). Communication software 304 provides communications through an external port to a network such as the Internet via a physical communications link by either directly invoking operating system functionality or indirectly bypassing the operating system to access the hardware for communications over the network.

Application programming interface (API) 306 allows the user of the system, an individual, or a software routine, to invoke system capabilities using a standard consistent interface without concern for how the particular functionality is implemented. Network access software 308 represents any software available for allowing the system to access a network. This access may be to a network, such as a local area network (LAN), wide area network (WAN), or the Internet. With the Internet, this software may include programs, such as Web browsers.

Figure 4:
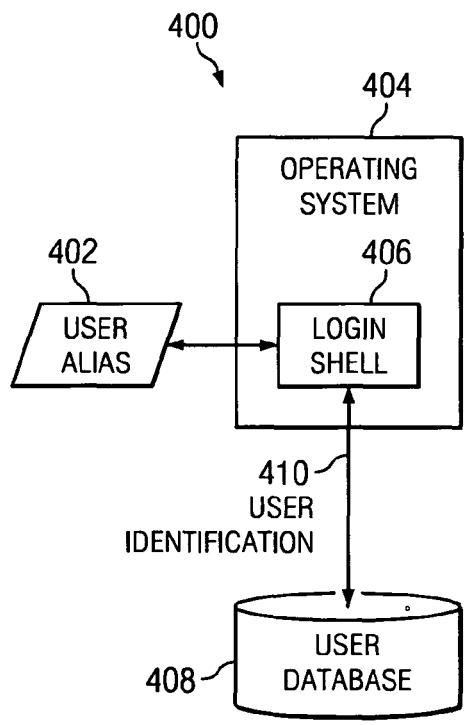
FIG. 4 is a block diagram illustrating a system for executing a sign-on procedure, in accordance with an exemplary embodiment of the present invention.

Application software 310 represents any number of software applications designed to react to data through the communications port to provide the desired functionality the user seeks, such as login shell 406 in FIG. 4. Applications at this level may include those necessary to handle data, video, graphics, photos or text, which can be accessed by users of the Internet.

In the most prevalent user sign-on processes there are two stages: (i) the user enters his/her user name and (ii) the user then enters a concealed password. Some systems print out an asterisk (*) on the screen for every character typed in the password. More sophisticated systems print a random number of asterisks on the screen so that a not so innocent bystander will have difficulties telling how many characters are in the password.

There is a problem in the first step of this process. When a user attempts to sign-on, the user types his/her user identification in the clear, on the screen, in full view of any potential hackers or thieves. In an exemplary embodiment, the present invention provides security enhancement by concealing user identifications by creating an alias between the user identification as displayed by system commands and available in the public user database. By concealing the user identification it becomes harder for an intruder to break into the system as the alias is the only name by which the user may gain access to the system, but does not serve any other purpose. Additional security can be added by implementing this functionality in combination with masking, the replacing of typed characters with asterisks. In addition, automated or periodic changes of mapping are ways of further enhancing security.

The alias, or login user name, should be kept out of sight for all users much the same as passwords are. In one exemplary embodiment, the alias may be kept alongside the "encrypted" password in /etc/shadow, as in the case of the Linux OS or in a similar file in other Unix flavors, such as /etc/security/password or /etc/security/user under AIX. In another embodiment the alias is also encrypted, possibly with the user's password as the key. Each real user identification value will have a one-on-one relation with the alias. The real user identification will be the name displayed by commands like 'who" and "ps", or under the user "Account" or "Sign-on" name on a webform, or as the owner of a file in a file directory listing, thereby avoiding the translation between the alias and the real user identification necessary to obtain the protected alias, as well as maintaining the secrecy of the name.

For this reason, knowing the user's real user identification would not help a potential intruder break in because the real user identification would not be used for signing on. Additionally, in another exemplary embodiment of the present invention, use of the real user identification during a sign-on procedure may be used as a signal that an attempted intrusion is in process. Selection of the user alias should not be taken lightly. That is, obvious choices such as "real user identification"+"secret" or +"hidden" and the like, preferably are not used. In another exemplary implementation of the present invention, the data processing system automatically generates and assigns aliases in much the same manner as passwords are generated and assigned automatically.

Additionally, protecting the alias requires that the alias be changeable in the event that the alias has been compromised, or as a matter of security policy, in a similar manner to mandatory password change requirements. Because the alias exists only as a mapping between itself and the real user identification, there is no need to change the real user identification in any other location should the alias be compromised. The mapping may be confined to the login or authentication component of the subsystem. This ability to easily change the alias also provides the ability to allow for a "one time pad" list of permitted aliases for use in connecting from an insecure environment where protected sign-on mechanisms such as secure shell (SSH) or challenge-response functionality is not available, such as at an Internet Café or another public access facility.

For a "one time pad" either the system generates and provides to the user or the user generates and provides to the system, a list of aliases to be used in non-secure environments. Each alias on the list is valid for one use only, after which the next alias on the list of aliases becomes the current valid alias and the previous entry is discarded. The process continues until the list is exhausted.

This would increase the security of a standard "one time pad" password mechanism by requiring that two separate "one time pads"—the list of user names and the list of associated passwords—are decoupled. Various combinations of "one time pad login user names" and a fixed alias might be further implemented so that the system could infer whether the user is connecting from a low security environment or a high security one.

This mapping is not a simple mapping, such as between joeuser@myhost.mycell, such as might be done with a Distributed Computing Environment (DCE) or Global Storage Architecture (GSA) authentication method, and the short name "joe", but rather a complete decoupling between the real identity and the login identity such that only a trusted, privileged process with the appropriate optional decryption key is able to perform the reverse mapping. In particular, existing mechanisms, such as Enterprise Identity Mapping (EIM), DCE, Kerberos, etc. all provide mechanisms for a non-trusted, non-privileged process to map between the names.

In an exemplary embodiment of the present invention, a database, or database column (in SQL terms), with a one-way, protected mapping from the alias to the real user identification is provided. There is no need to map from the real user identification to the alias, as the only purpose of the alias is performing the login authentication step. Therefore, as the mapping is one way, knowing a user's real user identification, which may be relatively easy to discover, will not allow a potential intruder to do a reverse search or mapping to find out the sign-on alias.

Additional security measures may include encrypting the alias using either the user's actual password, in which case it cannot be automatically altered without the use of some user password recovering mechanism, or a system-wide encryption key, or a combination of both, and storing an indication of which method is being used with the user information. When the alias is encrypted in the database, the first step in the authentication process is re-encrypting the alias that has been entered by the user to produce the key that is stored within the database. This encryption step may need to be performed with both the user's supplied password and the system-wide key. The newly encrypted value(s) would then be used to look-up the real user identification and obtain the relevant account information. Both the user-provided alias and its encrypted value(s) may then be discarded.

The alias may be changed by creating a mapping from the new alias value, in its clear text or cipher text form to the real user identification. This new value would be stored in the system database and subsequent authentications would be required to use this new value. The key used for encrypting the value, when it is configured, would be noted to insure that the correct key is used for re-encryption to prevent the highly unlikely situation where a collision might occur, as well as to enable the alias to be re-encrypted with the user's password when the current encryption has been performed using the system-wide key.

The advantage of using the system-wide key is that automated changes, such as with a "one time pad" of user names, or an administrator initiated change, may be automatically implemented. The disadvantage is that if this system-wide key is compromised, the value of all aliases can be readily determined if a two-way encryption algorithm is used. Therefore, a one-way transformation, such as encrypting using Data Encryption Standard (DES) and then computing a secure hash, such as, for example, using Secure Hash Algorithm 1 (SHA1), would be advantageous. The advantage of using the user's supplied password as the encryption key is that the user's password must be known for each entry in the database, thereby limiting the damage to a single user if his/her alias and password are compromised.

The present invention is not limited in scope to just the classic user sign-on and sign-out process. Exemplary implementations of the present invention may also be applied to other areas where it would be desirable to conceal identities in order to prevent abuse or theft of identity. For example, a user's real e-mail address may not change all that frequently as it is inconvenient for his/her contacts to continually update the e-mail address. But less secrecy than fully anonymous e-mail may be desired when there is no connection between an e-mail address and the user's true identity. In such an environment the user's e-mail address would be temporarily aliased to another value. This alias value is then published, such as on business cards or in e-mail signatures. Once that e-mail account has begun receiving spam, or after a policy determined time period, the e-mail alias is abandoned and a new alias is created. In this instance, unlike the login instance, the outgoing mail would have the correct e-mail address, rather than the alias, thereby allowing the recipient to reply to the correct address. When the aliased e-mail account is established, it is mapped in a one-way direction to the user's real e-mail address. Therefore e-mail addressed to the alias address is then automatically routed to the correct real e-mail address. The aliased e-mail account could be set up to automatically terminate after a set period of time or after a certain number of e-mails were received, etc.

In another exemplary implementation of the present invention, a credit card might automatically generate, such as by using a pre-defined algorithm or "one time pad" list of values, a stream of different credit card numbers, such that a business that obtained the number from the card could not accidentally or intentionally disclose that number and expose the user to fraud. That is, a credit card holder could request a list of credit card numbers from the credit card company. These credit card numbers are not real credit card numbers. Instead, these numbers are aliases that are linked to the card holder's real credit card number in the same manner as the user alias described above. Additional security measures could include putting a time limit, such a 1 month, for which the alias number is good or limiting the number of times the alias number may be used.

In another exemplary implementation of the present invention, an entity, either a business or the government, may allow employees, or citizens, to use an alternate identification number for public documents such that if the identification number (employee ID, Social Security number) were disclosed, the damage could be mitigated by changing the temporary, or alias, ID value. In such an implementation, the entity, either the business or government, would authenticate the user's information, such as, for example, name, date of birth, gender, and then provide a "valid" or "not valid" answer, in an analogous manner to the sign-on process described earlier.

FIG. 4 is a block diagram illustrating a system for executing a sign-on procedure, in accordance with an exemplary embodiment of the present invention. The system is designated by reference number 400. A user inputs user alias 402 into login shell 406 via an input screen. Login shell 406 is part of operating system (OS) 404. Login shell 406 communicates with user database 408 to obtain user identification 410.

User database 408 is a database, or database column, with a one-way, protected mapping from user aliases to the real user identifications. Login shell 406 verifies the validity of user alias 402. Login shell 406 then communicates with user database 408 to query the one way mapping to find the proper user identification 410 for user alias 402. User identification 410 is returned to OS 404. User identification 410 is used for system commands, file access and all other functions.

There is no need to map from user identification 410 to user alias 402, as the only purpose of user alias 402 is performing the login authentication step. Login authentication can be performed in a variety of ways and the user alias authentication can be stored in a variety of locations, including, but not limited to, for example, in /etc/shadow, as in the case of the Linux OS or in a similar file in other Unix flavors, such as /etc/security/password or /etc/security/user under AIX. Therefore, as the mapping is one way, knowing a user's real user identification will not allow a potential intruder to do a reverse search or mapping to find out the user alias.

Figure 5:
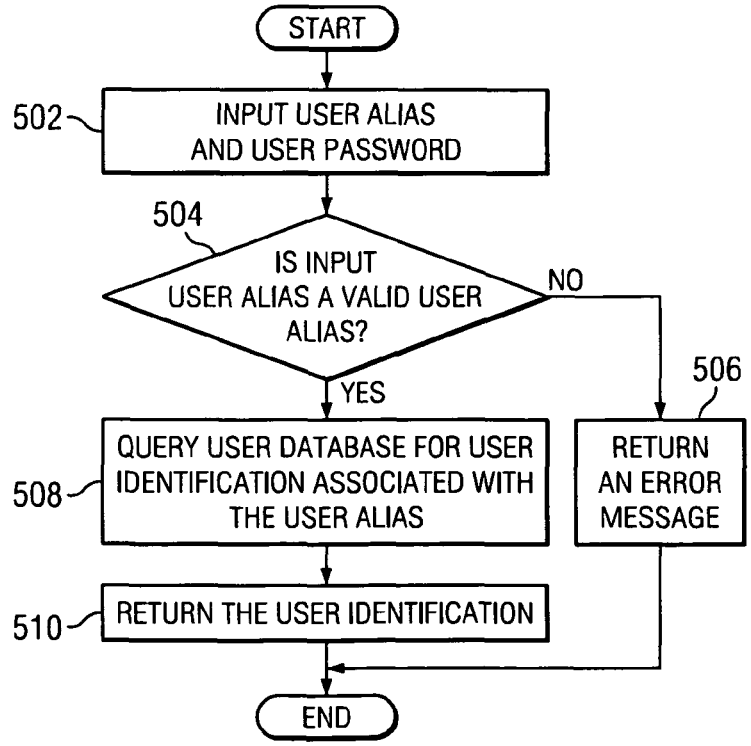
FIG. 5 is a flowchart illustrating the operation of signing-on, in accordance with an exemplary embodiment of the present invention.

FIG. 5 is a flowchart illustrating the operation of signing-on, in accordance with an exemplary embodiment of the present invention. The operation begins when the user inputs a user alias, such as user alias 402 in FIG. 4, together with his/her password to the log-in shell (step 502). The log-in shell determines if the input user alias is a valid user alias (step 504). If the log-in shell determines that the input user alias is not a valid user alias (a no output to step 504), the log-in shell returns an error message, such as "access denied" or "invalid entry", for example (step 506). If the log-in shell determines that the input user alias is a valid user alias (a yes output to step 504), the log-in shell queries the user database for the user identification associated with the user alias (step 508). The user data has one-way protected mapping from the user alias to the user identification. The user database then returns the user identification to the log-in shell (step 510). The user identification is then used for all other activity on the system. The process ends.

Figure 6:
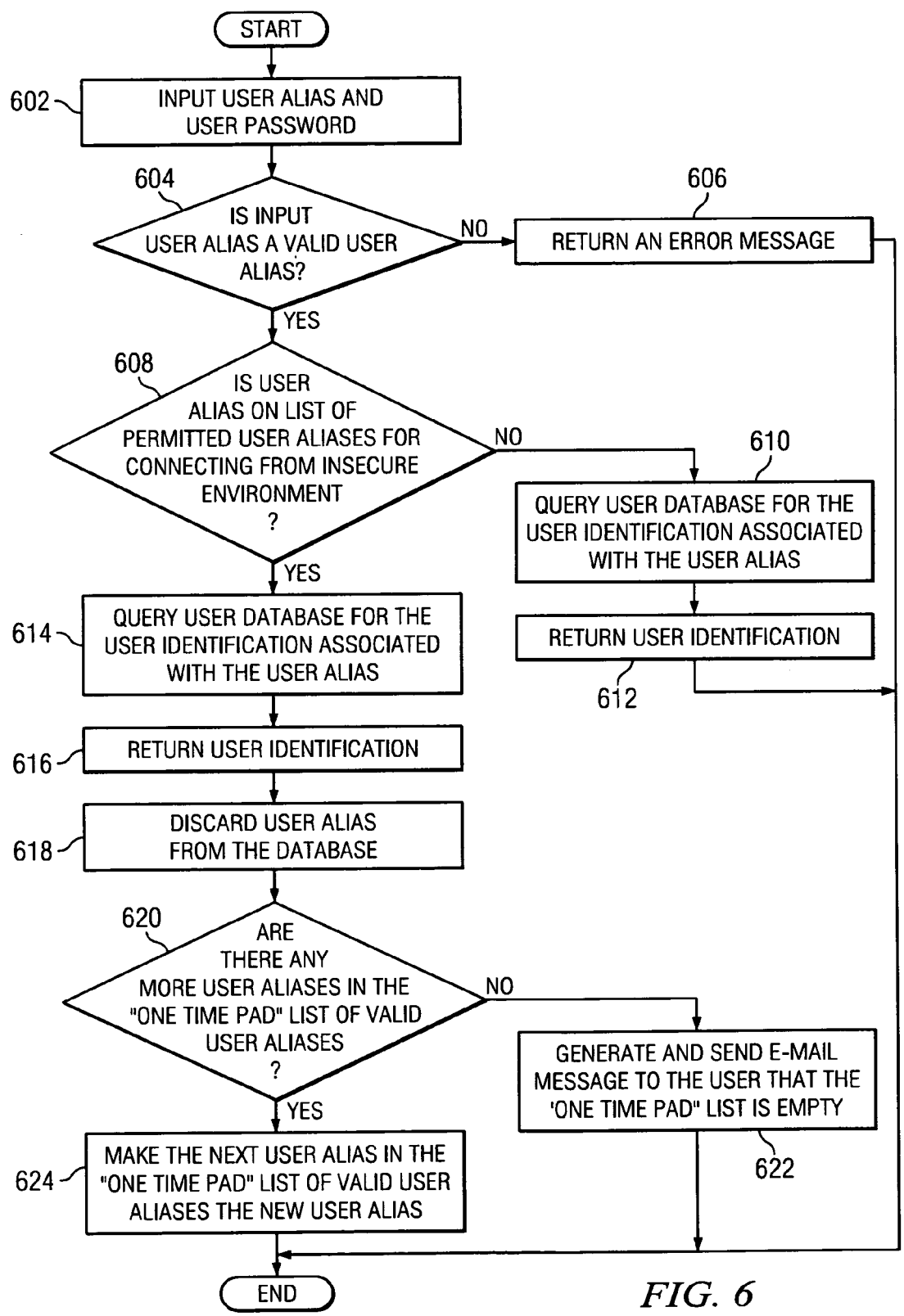
FIG. 6 is a flowchart illustrating the operation of a "one time pad" sign-on, in accordance with an exemplary embodiment of the present invention.

FIG. 6 is a flowchart illustrating the operation of a "one time pad" sign-on, in accordance with an exemplary embodiment of the present invention. The operation begins when the user inputs the user alias, such as user alias 402 in FIG. 4, together with his/her password to the log-in shell (step 602). The log-in shell determines if the input user alias is a valid user alias (step 604). If the log-in shell determines that the input user alias is not a valid user alias (a no output to step 604), the log-in shell returns an error message, such as "access denied" or "invalid entry", for example (step 606). If the log-in shell determines that the input user alias is a valid user alias (a yes output to step 604), the log-in shell determines if the user alias belongs to a list of user aliases permitted for use in connecting from an insecure environment (step 608).

If the log-in shell determines that the input user alias is not permitted for use in connecting from an insecure environment (a no output to step 608), the log-in shell queries the user database for the user identification associated with the user alias (step 610). The user data has one-way protected mapping from the user alias to the user identification. The user database then returns the user identification to the log-in shell (step 612) and the process ends. The user identification is then used for all other activity on the system.

If the log-in shell determines that the input user alias is permitted for use in connecting from an insecure environment (a yes output to step 608), the log-in shell queries the user database for the user identification associated with the user alias (step 614). The user database then returns the user identification to the log-in shell (step 616). The user alias is then discarded from the database (step 618). The operation determines if there are any more user aliases in the "one time pad" list of valid aliases (step 620). If there are not any more user aliases in the "one time pad" list of valid aliases (a no output to step 620), the operation generates and sends an e-mail message to the user stating that the "one time pad" list is empty (step 622) and the process ends. If there are more user aliases in the "one time pad" list of valid aliases (a yes output to step 620), the next user alias in the "one time pad" list of valid aliases becomes the user's new valid "one time pad" alias (step 624) and the process ends.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer implemented method for concealing a user identification, the computer implemented method comprising:
    receiving user input, wherein the user input comprises a user alias;
    verifying that the user alias is a valid user alias;
    obtaining a user identification associated with the valid user alias from a database comprising a one-way protected mapping of the valid user alias to the user identification, wherein only a trusted privileged process with a decryption key reverse maps the user identification back to the valid user alias, wherein if the valid user alias is compromised the valid user alias is removed without requiring change of the user identification required for permission;
    determining whether the valid user alias is one of a plurality of permitted user aliases permitted for one time use in association with the user identification in a database, for connecting in a non-secure environment;
    responsive to determining the valid user alias is one of a plurality of permitted user aliases specified for one time use in association with the user identification, discarding the valid user alias from the plurality of permitted user aliases stored in the database;
    determining whether there is at least one remaining valid user alias stored as the plurality of permitted user aliases in the database;
    responsive to detecting there is at least one remaining valid user alias, marking the next remaining valid user alias from among the plurality of permitted user aliases as the valid user alias; and
    responsive to detecting there is not remaining valid user alias, generating an sending an electronic mail message to the user specifying there are no remaining permitted user aliases in the database.

2. The computer implemented method of claim 1, further comprising:
    maintaining the association between the valid user alias and the user identification in a database; and
    responsive to receiving user input comprising the user identification and not the user alias associated with the database, marking the login with the user input as an attempted unauthorized access.

3. The computer implemented method of claim 1, further comprising:
    encrypting the valid user alias.

4. The computer implemented method of claim 3, further comprising:
    utilizing a user password as a key for the encryption.

5. The computer implemented method of claim 1, wherein the user alias is a false credit card number and wherein the user identification is an actual credit card number.

6. The computer implemented method of claim 1, further comprising:
    receiving the user input in an incoming e-mail, wherein the user alias is an alias e-mail address;
    obtaining the user identification comprising an actual e-mail address associated with the valid user alias;
    determining whether a time period for the alias e-mail address has expired; and
    responsive to the time period for the alias e-mail address not expiring, automatically routing the incoming e-mail to the actual e-mail address.

7. A computer executable program product comprising a tangible non-transitory computer readable storage device for concealing a user identification, wherein the computer usable program code when executed on a computer causes the computer to:
    receive user input, wherein the user input comprises a user alias;
    verify that the user alias is a valid user alias;
    obtain a user identification associated with the valid user alias from a database comprising a one-way protected mapping of the valid user alias to the user identification, wherein only a trusted privileged process with a decryption key reverse maps the user identification back to the valid user alias, wherein if the valid user alias is compromised the valid user alias is removed without requiring change of the user identification required for permission;

determine whether the valid user alias is one of a plurality of permitted user aliases permitted for one time use in association with the user identification in a database, for connecting in a non-secure environment;

responsive to determining the valid user alias is one of a plurality of permitted user aliases specified for one time use in association with the user identification, discard the valid user alias from the plurality of permitted user aliases stored in the database;

determine whether there is at least one remaining valid user alias stored as the plurality of permitted user aliases in the database;

responsive to detecting there is at least one remaining valid user alias, mark the next remaining valid user alias from among the plurality of permitted user aliases as the valid user alias; and responsive to detecting there is not remaining valid user alias, generate an sending an electronic mail message to the user specifying there are no remaining permitted user aliases in the database.

8. The computer program product of claim 7, wherein the computer-readable program when executed on the computer further causes the computer to:

maintain the association between the valid user alias and the user identification in a database; and receive user input comprising the user identification and not the user alias associated with the database, for marking the login with the user input as an attempted unauthorized access.

9. The computer program product of claim 7, wherein the computer-readable program when executed on the computer further causes the computer to:

encrypt the valid user alias.

10. The computer program product of claim 7, wherein the computer-readable program when executed on the computer further causes the computer to:

utilize a user password as a key for the encryption.

11. The computer program product of claim 7, wherein the computer-readable program when executed on the computer further causes the computer to:

utilize a user password as a key for the encryption.

12. The computer program product of claim 7, wherein the user alias is a false credit card number and wherein the user identification is an actual credit card number.

13. The computer program product of claim 7, wherein the computer-readable program when executed on the computer further causes the computer to:

receive the user input in an incoming e-mail, wherein the user alias is an alias e-mail address;

obtain the user identification comprising is an actual e-mail address associated with the valid user alias;

determine whether a time period for the alias e-mail address has expired; and responsive to the time period for the alias e-mail address not expiring, automatically route the incoming e-mail to the actual e-mail address.

14. A data processing system for concealing a user identification, said data processing system comprising:

a storage device, wherein the storage device stores computer usable program code; and a processor, wherein the processor executes the computer usable program code to receive user input, wherein the user input comprises a user alias; to verify that the user alias is a valid user alias; and to obtain a user identification associated with the valid user alias from a database comprising a one-way protected mapping of the valid user alias to the user identification, wherein only a trusted privileged process with a decryption key reverse maps the user identification back to the valid user alias, wherein if the valid user alias is compromised the valid user alias is removed without requiring change of the user identification required for permission;

wherein the processor further executes:

computer usable program code for determining whether the valid user alias is one of a plurality of permitted user aliases permitted for one time use in association with the user identification in a database, for connecting in a non-secure environment;

computer usable program code, responsive to determining the valid user alias is one of a plurality of permitted user aliases specified for one time use in association with the user identification, for discarding the valid user alias from the plurality of permitted user aliases stored in the database;

computer usable program code for determining whether there is at least one remaining valid user alias stored as the plurality of permitted user aliases in the database;

computer usable program code, responsive to detecting there is at least one remaining valid user alias for marking the next remaining valid user alias from among the plurality of permitted user aliases as the valid user alias; and computer usable program code, responsive to detecting there is not remaining valid user alias, for generating an sending an electronic mail message to the user specifying there are no remaining permitted user aliases in the database.

15. The data processing system of claim 14, wherein the processor further executes computer usable program code for maintaining the association between the valid user alias and the user identification in a database and responsive to receiving user input comprising the user identification and not the user alias associated with the database, for marking the login with the user input as an attempted unauthorized access.

16. The data processing system of claim 14, wherein the valid user alias is one of a plurality of valid user aliases permitted for use in a non-secure environment.

17. The data processing system of claim 14, wherein the user alias is a false credit card number and wherein the user identification is an actual credit card number.

* * * * *